US008862116B2

(12) United States Patent
Lim

(10) Patent No.: US 8,862,116 B2
(45) Date of Patent: Oct. 14, 2014

(54) METHOD AND APPARATUS FOR IDLE MODE OPERATION IN FEMTO-CELL

(75) Inventor: Jaewon Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 13/391,159

(22) PCT Filed: Sep. 10, 2010

(86) PCT No.: PCT/KR2010/006189
§ 371 (c)(1),
(2), (4) Date: Feb. 17, 2012

(87) PCT Pub. No.: WO2011/031096
PCT Pub. Date: Mar. 17, 2011

(65) Prior Publication Data
US 2012/0149358 A1    Jun. 14, 2012

(30) Foreign Application Priority Data

Sep. 11, 2009 (KR) .................. 10-2009-0086108

(51) Int. Cl.
*H04M 3/00* (2006.01)
*H04W 24/02* (2009.01)
*H04W 52/02* (2009.01)
*H04W 84/04* (2009.01)

(52) U.S. Cl.
CPC .......... *H04W 24/02* (2013.01); *H04W 52/0206* (2013.01); *H04W 84/045* (2013.01)
USPC .......... 455/419; 455/418; 455/420; 455/443; 455/444; 455/446; 455/450; 455/451; 455/452.1; 455/452.2; 455/453; 455/561; 370/310.2; 370/328; 370/338

(58) Field of Classification Search
USPC ......... 455/418–420, 443–444, 446, 450–453, 455/561; 370/310.2, 328, 338
See application file for complete search history.

(56) References Cited

U.S. PATENT DOCUMENTS 5,613,211 A * 3/1997 Matsuno ................ 455/502
6,018,667 A * 1/2000 Ghosh et al. ............. 455/502

(Continued)

FOREIGN PATENT DOCUMENTS

EP       2071738 A1   6/2009
KR  10-2004-0058357 A   7/2004

OTHER PUBLICATIONS

International Search Report issued in PCT/KR2010/006189, dated Jun. 24, 2011.

*Primary Examiner* — Steve D Agosta
(74) *Attorney, Agent, or Firm* — Birch, Stewart, Kolasch & Birch, LLP

(57) ABSTRACT

Disclosed are a method and apparatus for solving an interference between femto base stations in an idle mode operation and facilitating searching of a femto cell in an idle mode. A method for operating a femto cell in an idle mode, includes: receiving an idle mode conversion notification from a first femto base station; checking the presence of a second femto base station in an idle mode among neighboring femto base stations near or around the first femto base station which has notified about the conversion of the idle mode and then optimizing an idle mode operation of the first and second femto base stations; delivering an idle mode operation parameter according to the optimized idle mode operation to the first and second femto base stations; and receiving an idle mode operation acknowledgement message according to the idle mode operation parameter from the first and second femto base stations.

5 Claims, 3 Drawing Sheets

(56) References Cited

U.S. PATENT DOCUMENTS

| | | | |
|---|---|---|---|
| 8,155,025 B2* | 4/2012 | Benveniste et al. | 370/252 |
| 8,295,874 B2* | 10/2012 | Harris et al. | 455/522 |
| 2005/0130644 A1 | 6/2005 | Bassompierre et al. | |
| 2007/0249380 A1* | 10/2007 | Stewart et al. | 455/502 |
| 2009/0042593 A1* | 2/2009 | Yavuz et al. | 455/522 |
| 2009/0197631 A1 | 8/2009 | Palanki et al. | |
| 2009/0280819 A1* | 11/2009 | Brisebois et al. | 455/446 |
| 2011/0130142 A1* | 6/2011 | Hsu et al. | 455/436 |

* cited by examiner

METHOD AND APPARATUS FOR IDLE MODE OPERATION IN FEMTO-CELL

FIELD OF THE INVENTION

The present invention relates to an idle mode operation of a femto base station and, more particularly, to a method and apparatus for solving an interference between femto base stations in an idle mode operation and facilitating searching of a femto cell in an idle mode.

BACKGROUND ART

A femto cell is a term obtained by combining a femto, denoting a factor of $10^{-15}$ or 0.000000000000001, and a cell, which refers to a very small mobile communication base station installed indoors such as homes, offices, and the like.

A femto cell is installed in an area in which radiowaves of a macro cell are degraded in a shadow area, like indoor areas, in order to improve a service available area and improve the capacity to increase quality of service (QoS).

FIG. 1 illustrates an architecture of a mobile communication system in which femto cells are installed.

The femto cells are connected to a femto cell controller 103 through a broadband network, and the femto cell controller 103 is connected to a mobile communication core network.

In general, the femto cells have a small number of terminal entities connected to their coverage to receive a service. Thus, when a terminal connected to each femto cell operates in an idle mode or when there is no terminal connected within a femto cell coverage, the femto cells operate in a femto cell idle mode (Femto Cell Low Duty Cycle Mode, 110, 120, 130) in order to prevent unnecessary power consumption. Also, the femto cells may operate in the idle modes 110, 120, and 130 in order to cancel interference between the macro cell and the femto cells or between the femto cells.

For the idle mode operation of the femto cells, an application of an idle mode scheme of general terminals may be taken in consideration; however, because the femto cells are a sort of small base stations, the application of the idle mode scheme of terminals are as it is may cause some problems. Namely, in case of a terminal, an idle mode of the terminal may be immediately changed from an idle mode to an active mode by a user manipulation or a paging message delivered in a network, but in case of the femto cells, if an operation scheme of the femto cells is changed through a manipulation of the user who uses the femto cells or according to a paging signal through a network, it is difficult to quickly and appropriately cope with the surrounding environment of the femto cells.

Also, when many femto cells operate in the idle mode around, interference between the femto cells in the idle mode may be generated or a terminal cannot receive information of the corresponding femto cells due to the difference in an operational period of the idle mode, causing a problem in that it is difficult to search for a nearby femto cell.

SUMMARY OF THE INVENTION

Therefore, in order to address the above matters, the various features described herein have been conceived.

An aspect of the present invention provides a method for operating a femto cell in an idle mode capable of quickly and appropriately coping with the surrounding environment of a femto cell, and a method for operating a femto cell in an idle mode capable of allowing adjacent femto cells in an idle mode to cooperatively operate.

Another aspect of the present invention provides a method for operating a femto cell in an idle mode capable of preventing an interference between femto cells and allowing terminals to easily search femto cells in an idle mode of a corresponding area by enabling the adjacent femto cells in the idle mode to cooperatively adjust a control signal transmission period.

According to an aspect of the present invention, there is provided a method for operating a femto cell in an idle mode. The method for operating a femto cell in an idle mode may include: determining whether or not a first femto cell is to enter an idle mode; transmitting, by the first femto cell, information regarding one or more femto cells that neighbor the first femto cell to a femto cell controller if it is determined that the first femto cell is to enter the idle mode; and receiving, by the first femto cell, control information regarding the idle mode from the femto cell controller, wherein the control information includes an operation parameter for minimizing interference between the first femto cell and at least one of the neighboring femto cell and a macro cell, and the first femto cell operates in the idle mode on the basis of the operation parameter.

The information regarding the one or more neighboring femto cells may include one or more of identification information of the one or more neighboring femto cells and information indicating whether or not the one or more neighboring femto cells operate in an idle mode.

In transmitting the information regarding one or more neighboring femto cells, one or more of identification information and location information of the first femto cell may be transmitted.

The control information may be for controlling signals transmitted by the first femto base station and the neighboring femto base stations such that the signals are successively transmitted without overlapping with each other. A guard interval may be inserted into a transmission interval between the signals.

The control information may be for controlling a reference signal and system information to be transmitted by the first femto cell. The control information may include one or more of a periodicity (or transmission period), a transmission interval, and an offset time (or a transmission start time) with respect to the reference signal and the system information.

The method may further include: determining whether to change the first femto cell into an active mode after the idle mode operation; transmitting, by the first femto cell, information regarding one or more femto cells that neighbor the first femto cell to the femto cell controller if it is determined to change the first femto cell into the active mode; and receiving, by the first femto cell, control information regarding the active mode from the femto cell controller, wherein the control information includes an operation parameter for minimizing interference between the first femto cell and at least one of the neighboring femto cell and a macro cell. The method may further include: changing the first femto cell into an active mode on the basis of the operation parameter.

According to another aspect of the present invention, there is provided a femto base station. The femto base station may include: a processor configured to determine whether or not the femto base station is to enter an idle mode; and a transceiver configured to transmit information regarding one or more neighboring femto cells to the femto cell controller under the control of the processor if the processor determines that the femto BS is to enter the idle mode, and receive control information regarding the idle mode from the femto cell controller. The control information may include an operation parameter for minimizing interference between the femto base station and the neighboring femto base station and a macro base station. The processor may control the femto base station to operate in the idle mode on the basis of the received operation parameter.

According to another aspect of the present invention, there is provided a method for operating a femto cell in an idle mode, including: receiving an idle mode conversion notification from a first femto base station; checking the presence of a second femto base station in an idle mode among neighboring femto base stations near or around the first femto base station which has notified about the conversion of the idle mode and then optimizing an idle mode operation of the first and second femto base stations; delivering an idle mode operation parameter according to the optimized idle mode operation to the first and second femto base stations; and receiving an idle mode operation acknowledgement message according to the idle mode operation parameter from the first and second femto base stations.

The idle mode conversion notification of the first femto base station may include ID information of the first femto base station, ID information of neighboring femto base stations, and ID information of a femto base station in an idle mode among the neighboring femto base stations.

In optimizing the idle mode operation, a control signal transmission intervals of the first and second femto base stations are allocated such that they do not overlap and control signals of the first and second femto base stations are successively transmitted within a particular time interval.

According to another aspect of the present invention, there is provided an apparatus for controlling an idle mode operation of a femto cell, including: a memory unit configured to store femto base station information and location information of femto cells; a transceiver configured to receive an idle mode conversion notification from a femto base station and transmitting an idle mode operation parameter to the femto base station and neighboring femto base stations; and an idle mode operation controller configured to check the presence of a femto base station in an idle mode state among the neighboring femto base station of the femto base station which has notified about the idle mode conversion with reference to the information stored in the memory unit, optimize an idle mode operation of the femto base station and the neighboring femto base stations, and generate an idle mode operation parameter according to the optimized idle mode operation.

The idle mode operation controller may allocate control signal transmission intervals of the femto base station and the neighboring femto base stations such that they do not overlap and control signals of the femto base station and the neighboring femto base stations are successively transmitted within a particular time interval, thus optimizing the idle mode operation.

According to another aspect of the present invention, there is provided a method for operating a femto cell in an idle mode; receiving an active mode conversion notification from femto base station in an idle mode; checking the presence of neighboring femto base stations in an idle mode state among neighboring femto base stations of the femto base station which has notified about the conversion of the active mode, and updating the idle mode operation of the neighboring femto base stations to optimize the idle mode operation; delivering an idle mode operation parameter according to the optimized idle mode operation to the neighboring femto base stations; and receiving an idle mode operation change acknowledgement message according to the idle mode operation parameter from the neighboring femto base stations.

According to another aspect of the present invention, there is provided a method for searching a femto cell by a terminal which receives a communication service through a femto cell included in a macro base station; including: searching, by the terminal femto cells that neighbor a femto cell to which the terminal belongs; when a femto in an idle mode state exists, delivering, by the terminal, an ID of the femto cell in the idle mode state to the macro base station; receiving information regarding idle mode operations of neighboring femto cells in an idle mode state adjacent to the femto cell in the idle mode state from the macro base station; and searching neighboring femto cells in an idle mode state with reference to the information regarding the idle mode operation of the neighboring femto cells, and transmitting the results to the femto cell to which the terminal belongs.

According to exemplary embodiments of the present invention, a femto cell can operate in an idle mode while quickly and appropriately coping with the surrounding environment of the femto cell, and the idle mode operation of the femto cell can be dynamically adjusted in order to minimize power consumption and make an effective transmission.

In addition, because the adjacent idle mode femto cells cooperatively adjust control signal transmission periods, interference can be prevented, and a terminal can easily search femto cells in an idle mode of a corresponding area.

The foregoing and other objects, features, aspects and advantages of the present invention will become more apparent from the following detailed description of the present invention when taken in conjunction with the accompanying drawings.

DETAILED DESCRIPTION OF THE INVENTION

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

In the following description, a terminal is used, but the terminal may be also referred to by other names such as subscriber station (SS), user equipment (UE), mobile equipment (ME), mobile station (MS), or the like. Also, the UE may be a portable device such as a mobile phone, a PDA, a smartphone, a notebook computer, and the like, or a non-portable device such as a PC or a vehicle-mounted device.

A femto cell idle mode is defined as a technique of preventing power consumption and canceling interference with an adjacent cell and UE by limiting an external communication function of a femto cell when a femto base station and a UE do not need to transmit data to each other.

The femto cell refers to a femto base station or a physical service area of the femto base station, and in the present disclosure, the femto cell may be used to have the same meaning as a femto base station.

A femto cell controller refers to a femto network controller (FNC) handling general controlling of femto cells, but according to circumstances, the femto cell controller may designate the function of a mobility management entity (MME) of a core network in relation with controlling an idle mode operation.

Figure 1:
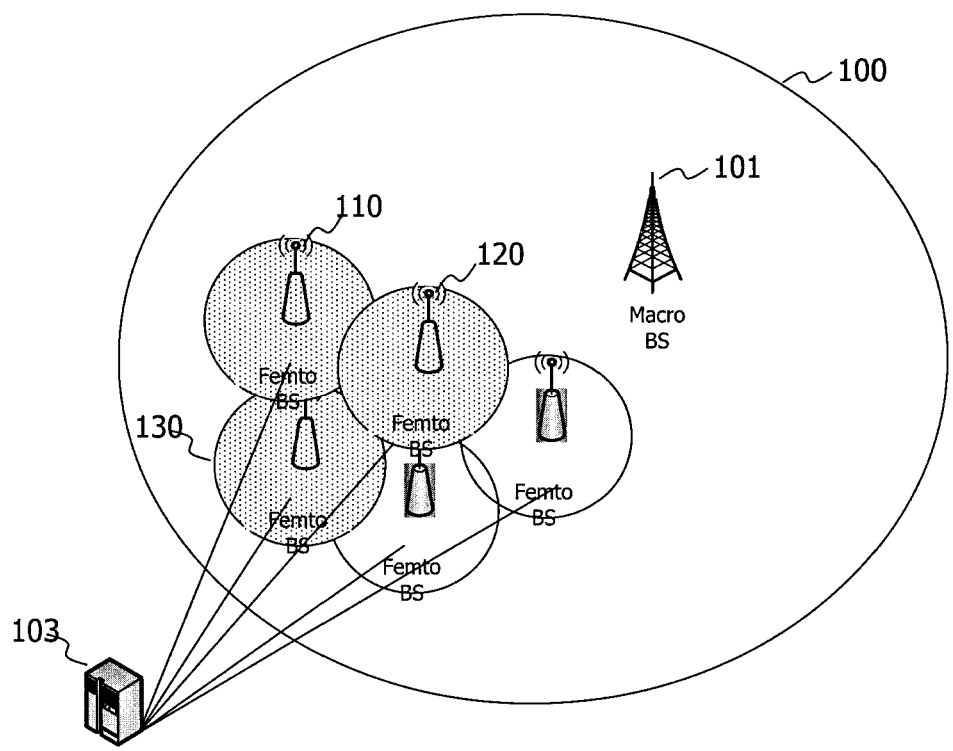
FIG. 1 illustrates an architecture of a mobile communication system in which femto cells are installed.
Figure 2:
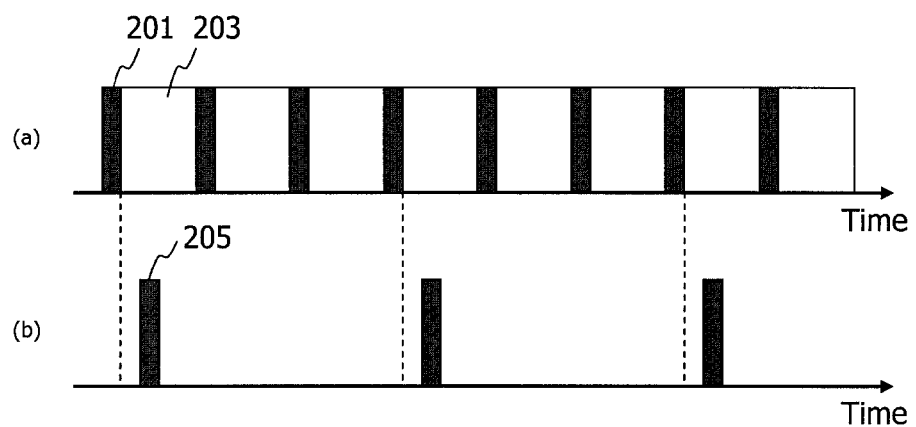
FIG. 2 shows the comparison between operations of an active mode femto cell and an idle mode femto cell.

FIG. 2 shows the comparison between operations of an active mode femto cell and an idle mode femto cell.

FIG. 2(a) illustrates the operation of an active mode femto cell. A control signal 201 and a data signal 203 including a reference signal and system information (or a system parameter) for checking and synchronizing a femto cell are successively or continuously transmitted.

FIG. 2(b) illustrates an operation of an idle mode femto cell. A control signal 205 such as a reference signal including a femto cell ID, system information, and the like, is periodically transmitted, and no signal is generated in other sections or intervals.

In a base station following 3GPP standard, the reference signal of the femto cells may be a primary synchronization signal (PSS) and a secondary synchronization signal (SSS) and, in an IEEE 802.6 system, the reference signal of the femto cells may be a frame preamble signal.

Through the reference signals, information regarding a physical cell identity (PCI) of a femto cell, a cyclic prefix length, or a duplex type of TDD/FDD or the like, is delivered. System information of the femto cells may include scheduling information, other femto cell operation parameter, or the like.

As shown in FIG. 2, the control signals 201 and 205 in the active mode and the idle mode of the femto cells are configured to be transmitted at different time intervals in order to avoid mutual interference.

Figure 3:
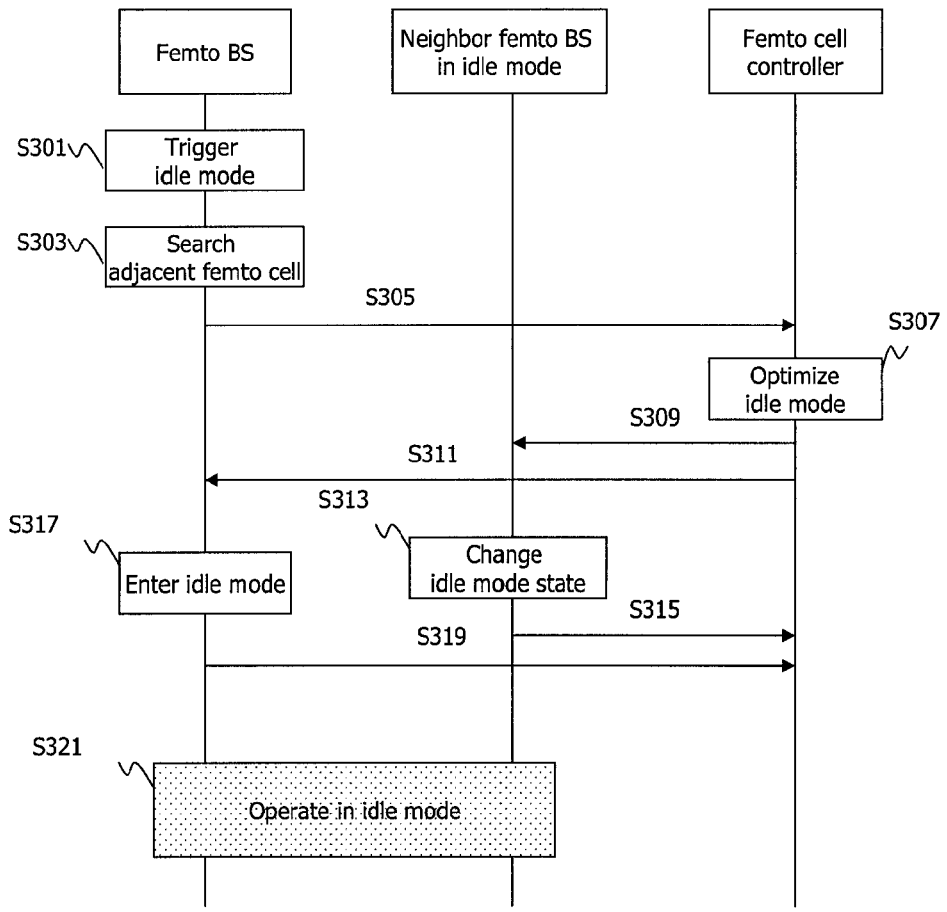
FIG. 3 is a flow chart illustrating the process of optimizing an idle mode operation between neighboring idle mode femto cells through a femto cell controller.

FIG. 3 is a flow chart illustrating the process of optimizing an idle mode operation between neighboring idle mode femto cells through a femto cell controller.

When there is no connected UE or when only an idle mode UE exists in a femto cell service area, the corresponding femto cell starts changing to an idle mode (S301).

In this case, the corresponding femto cell searches information regarding femto cells that neighbor the corresponding femto cell itself and information regarding an adjacent idle mode femto cell (S303).

The adjacent femto cell information and neighboring idle mode femto cell information can be periodically checked through searching of neighbor femto cells even in a previous active mode, and can be obtained by searching adjacent femto cells at a point in time when the corresponding femto cell changes to the idle mode.

The searching of the adjacent femto cells may be directly performed by a femto base station, or a UE belonging to the femto cell may periodically search adjacent femto cells and the femto base station receives the search results, thus recognizing adjacent femto cell information.

Thereafter, the corresponding femto cell notifies the femto cell controller that administers controlling of femto cells about its idle mode conversion (S305).

Here, the femto cell controller refers to a femto cell network controller (FNC) that handles general controlling of femto cells, and according to circumstances, the corresponding femto cell that wants to change to the idle mode may directly notifies a core network or a mobility management entity (MME) about its idle mode conversion.

When the corresponding femto cell notifies about its idle mode conversion, it also delivers the neighbor femto cell information and the neighbor idle mode femto cell information which have been searched in the adjacent femto cell searching operation S303.

Upon being notified about the idle mode conversion of the corresponding femto cell (S505), the FNC or the MME checks the neighbor femto base station information of the corresponding femto cell which has been transmitted by the corresponding femto cell and location information of femto cells retained by the FNC or the MME to determine whether or not there are idle mode femto cells close to the corresponding femto cell.

When the femto cell which has notified about the idle mode conversion and adjacent idle mode femto cells exist, the FNC or the MME performs an idle mode optimization operation in order to optimize a mutual idle mode operation while restraining interference between the corresponding femto cell intending to be changed to the idle mode and the adjacent idle mode femto cells (S307).

Here, the optimization of the idle mode operation refers to performing an idle mode state operation by the femto cells in the idle mode state under the optimum conditions without interfering with each other.

When the optimization of the idle mode operation is performed, a corresponding idle mode operation parameter (Femto Cell Idle Mode Configuration Parameter) is generated.

The idle mode operation parameter of the idle mode femto cells includes a signal transmission period (periodicity), the size of a signal transmission interval (Transmission Interval), a start time (Offset Time) at which a corresponding signal is to be transmitted, and the like. The Offset Time may be indicated as a location, of a particular OFDMA frame of a 3GPP LTE (Long Term Evolution) or IEEE 802.16, from which a reference signal and system information are to be transmitted, or a point in time that can be globally applied to a femto cell timer.

In optimizing the idle mode operation of the adjacent idle mode femto cells in the femto cell controller, the femto cell controller configures control signal transmission intervals, during which the adjacent idle mode femto cells transmit a control signal, respectively, such that they do not overlap with each other, and also configures the control signal transmission intervals of the adjacent femto cells such that they are continuously transmitted within a particular time interval.

The reason for configuring the transmission intervals of the adjacent idle mode femto cells such that they do not overlap is because, if the transmission intervals overlap, a signal interference would be generated among the idle mode femto cells, making it difficult to the UE to search the idle mode femto cells. In addition, because the transmission intervals of the adjacent femto cells are configured to be continuously transmitted at a particular time interval, the UE can search a plurality of idle mode femto cells of a corresponding region as many as possible through one time searching.

The optimization of the idle mode of the femto cell controller will now be described in more detail. The adjacent idle mode femto cells may have the same signal transmission period or a signal transmission period value having a time of integral times of the signal transmission period, so that the control signals cannot overlap with each other. Also, a start time (offset time) may be adjusted to make information transmission intervals of the adjacent idle mode femto cells continued during a certain period, so that when the UE search an idle mode femto cell, it can search femto cells as many as possible during a one-time search session, thus facilitating searching.

In addition, the control signal transmission intervals of the idle mode femto cells are configured such that they do not overlap with a control signal (reference signal and system information) transmission interval of the macro base station. Thus, after a macro base station UE receives scheduling information included in system information of the macro base station, when there is no data transmitted to or received from the macro base station UE, the macro base station UE can search idle mode femto cells.

When the idle mode optimization is completed in the femto cell controller (S307), the femto cell controller transmits an optimized idle mode parameter to the corresponding femto cell and the adjacent idle mode femto cells (S309, S311).

Upon receiving the optimized idle mode parameter from the femto cell controller, the neighbor idle mode femto cells operate in the idle mode (S311).

In this case, however, if a currently set idle mode of the neighbor idle mode femto cells is the same as the idle mode newly optimized by the femto cell controller, the femto cell controller may not transmit the optimized idle mode parameter.

When the neighbor femto cells receive the optimized idle mode operation setting parameter, they transmit an ACK message to the femto cell controller (S513).

Also, the corresponding femto cell desired to be changed to the idle mode enters the idle mode according to the idle mode parameter which has been received from the femto cell controller (S317) and transmits an ACK message to the femto cell controller (S319).

The optimized idle mode operation parameter delivered to the femto cells includes information such as a signal transmission period (period), the size of a signal transmission interval (Transmission Interval), a start time (offset time) at which a corresponding signal is to be transmitted, and the like.

Figure 4:
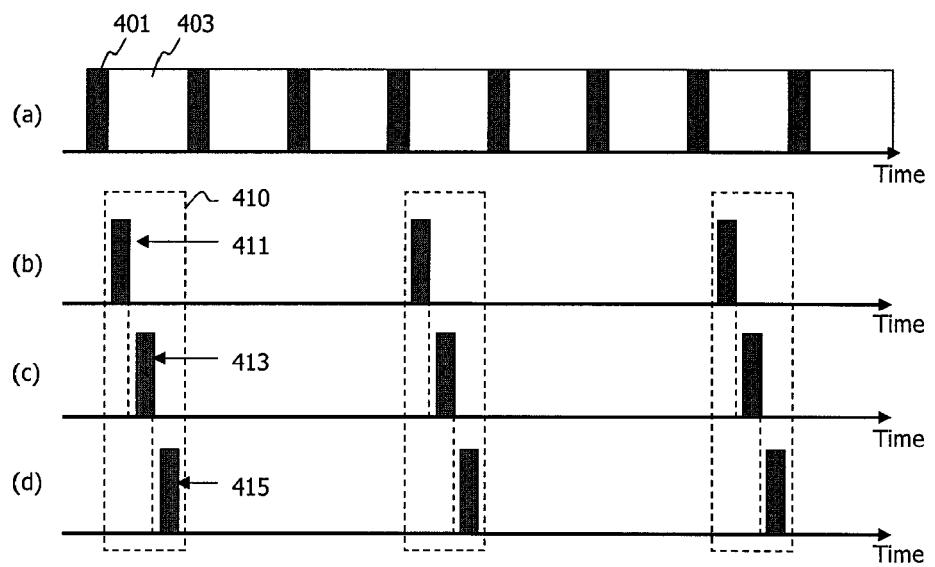
FIG. 4 is a view showing the operation of transmission of control signals between neighboring femto cells through optimization of an idle mode in the femto cell controller.

FIG. 4 is a view showing the operation of transmission of control signals between neighboring femto cells through optimization of an idle mode in the femto cell controller.

FIG. 4(a) illustrates transmission operations of a control signal and a data signal transmitted from the macro base station to the UE. The UE determines whether or not there is a data signal 403 transmitted to or received from the UE with reference to a reference signal and system information (i.e., system parameter) included in a control signal 401. When there is no data signal, the UE changes to an idle mode. In this case, the UE performs searching to check whether or not there is an idle mode femto cell among femto cells adjacent to a femto cell to which the UE belongs during a time interval corresponding to a data signal transmission interval.

When adjacent femto cells b, c, and d are in an idle mode, the femto cell controller performs idle mode optimization as described above, and transmits an idle mode optimization parameter to the corresponding femto cell and the adjacent femto cells b, c, and d. Then, the adjacent idle mode femto cells transmit control signals 411, 413, and 415 within a particular time interval 410, respectively, such that control signal transmission intervals of the respective idle mode femto cells do not overlap as shown in FIGS. 4(b), (c), and (d). Preferably, the particular time interval 410 may be configured to come within the data transmission interval 403 of the macro base station.

Figure 5:
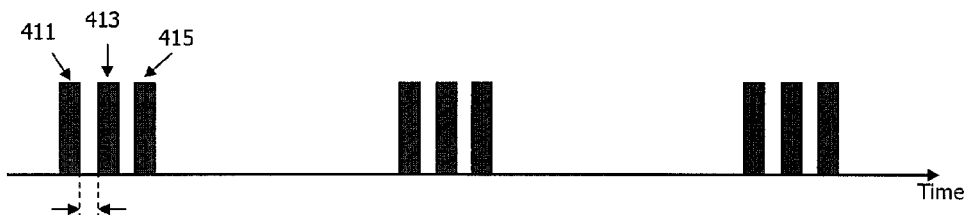
FIG. 5 is a view illustrating guard intervals in transmitting control signals between neighboring femto cells.

Preferably, as shown in FIG. 5, a guard interval 510 is positioned between the transmission intervals of the control signals 411, 413, and 415 of the adjacent idle mode femto cells. The reason of the presence of the guard interval is because it is difficult for the accuracy of a timer of each of the femto cells to be maintained, so a timer error can occur among the femto cells as time goes by. Namely, although the idle mode operations are adjusted by the FNC or the MME, the transmission intervals may overlap as time goes by due to the timer error of the respective femto cells. Thus, the presence of the guard interval prevents the transmission intervals from overlapping at least for a while although there is a timer error.

A time value of the guard interval may vary according to the accuracy of the timers of the femto cells. Namely, when the performance of the timers of the idle mode femto cells is not good, the guard interval may be longer, and when the performance of the timers of the idle mode femto cells is good, the guard interval may be shorter. Also, the idle mode configuration may be periodically readjusted by the FNC or the MME to readjust a corresponding error.

Figure 6:
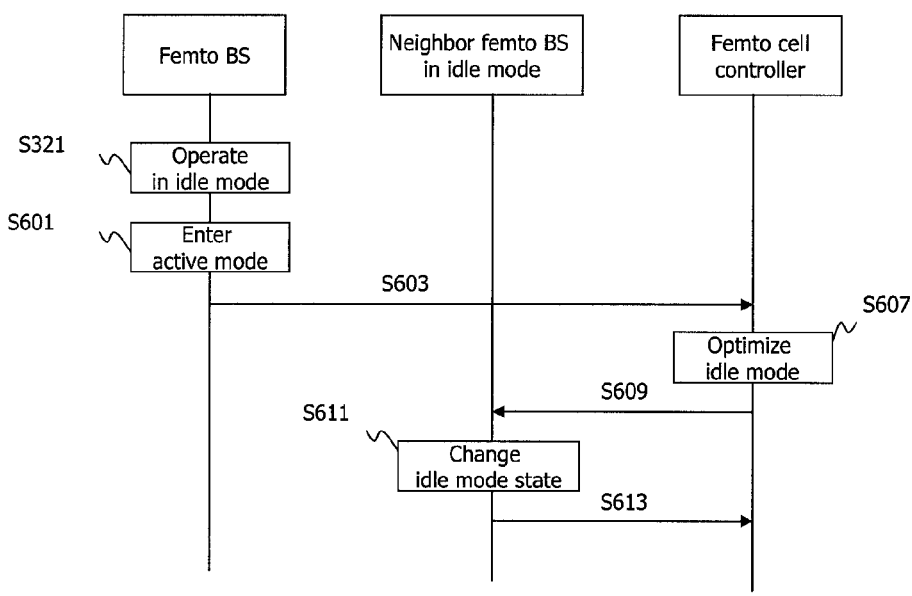
FIG. 6 is a flow chart illustrating the process of optimizing an idle mode operation between neighboring femto cells when a femto cell is changed from an idle mode to an active mode.

FIG. 6 is a flow chart illustrating the process of optimizing an idle mode operation between neighboring femto cells when a femto cell is changed from an idle mode to an active mode.

While the femto cell is operating in the idle mode (S521), when the UE in the idle mode is changed to an active mode or when a UE that newly requests a service accesses the femto cell, the corresponding femto cell terminates the idle mode and enters the active mode (S601).

Accordingly, the femto base station in the idle mode notifies the femto cell controller about the conversion into the active mode (S603), and then operates in the active mode.

Upon being notified about the conversion into the active mode from the corresponding femto cell, the femto cell controller optimizes the idle mode operations of the other remaining idle mode femto cells, excluding the corresponding femto cell from the idle mode femto cell group that the femto cell controller administers (S607). Namely, the femto cell controller newly adjusts the idle mode operation parameter such that the idle mode operations of the neighboring idle mode femto cells in consideration of the femto cell which is changed from the idle mode to the active mode. The detailed idle mode optimization method of the femto cell controller has been described above with reference to FIG. 3, so a detailed description thereof will be omitted.

The femto cell controller transmits the updated idle mode operation setting parameter to the adjacent idle mode femto cells (S609).

Upon receiving the idle mode operation setting parameter, the adjacent idle mode femto cells changes an idle mode operational state according to the updated optimization parameter, respectively (S611).

However, when the current idle mode operation parameter of the neighboring idle mode femto cells are the same as the optimized idle mode operation parameter so there is no need to change the idle mode operation, the femto cell controller may not deliver the operation parameter to the adjacent idle mode femto cells.

The adjacent idle mode femto cells, which have received the idle mode operation parameter from the femto cell controller, changes the idle mode operation according to the received idle mode parameter to operate in an optimized idle mode and transmits an ACK message to the femto cell controller (S613).

In a different exemplary embodiment of the present invention, when the femto cell currently operating in the idle mode needs to adjust or change its idle mode operation according to a situation without an instruction from the femto cell controller, the corresponding idle mode femto base station may adjust or change the operation setting parameter by itself to newly adjust the idle mode operation and then notify the femto control state accordingly.

Then, the femto cell controller newly performs idle mode optimization by reflecting the idle mode operation parameter received from the femto base station. And then, the femto cell base station transmits the optimized idle mode operation parameter to the adjacent idle mode femto cells to optimize the idle mode of the neighboring femto cells.

Figure 7:
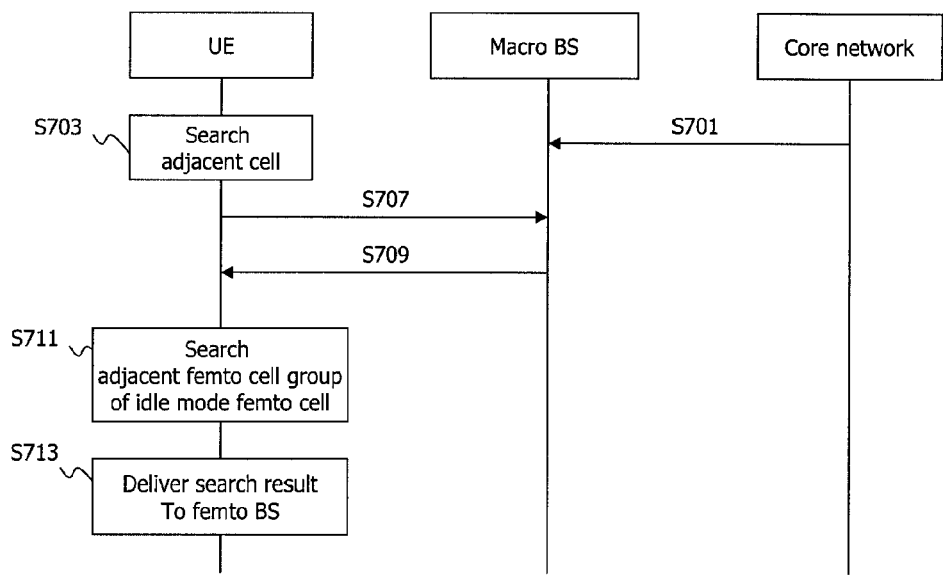
FIG. 7 is a flow chart illustrating the process of searching an idle mode femto cell by a terminal.

FIG. 7 is a flow chart illustrating the process of searching an idle mode femto cell by a terminal.

As discussed above, the corresponding femto cell may directly search the adjacent femto cells, or the UE may search the adjacent femto cells and inform the femto cell, to which the UE belongs, about the search result.

The present invention proposes the method for shortening time required for the UE to search adjacent femto cells, when the UE searches the adjacent femto cells and informs the corresponding femto cell about the search results.

The FNC or the MME delivers idle mode femto information including a signal transmission period (periodicity), the size of a signal transmission interval (Transmission Interval), a start time (Offset Time) at which a corresponding signal is to be transmitted, and the like, of the idle mode femto base stations to the macro base station to which the femto cells belong, through the core network (S701).

The UE searches adjacent femto cells. When the UE searches one or more femto cells in the idle mode (S703), the UE transmits information such as an ID, or the like, of the searched idle mode femto cells to the macro abase station (S707).

Upon receiving the idle mode femto cell search results from the UE, the macro base station delivers operation information of the idle mode femto cell group including the IDs of the searched idle mode femto cells and adjacent idle mode femto cells to the UE, with reference to the idle mode femto cell information which has been previously received from the core network (S709).

Upon receiving the adjacent idle mode femto cell operation information, the UE searches the continued transmission signal intervals of the adjacent idle mode femto cells with reference to the received idle mode operation information, thus searching the adjacent idle mode femto base stations at a time (S711).

Thus, the search time of the UE for the idle mode femto cells can be shortened by referring to the ID information of the adjacent femto cell group received from the macro base station.

Thereafter, the UE delivers the search results of the adjacent idle mode femto base stations to the femto cell to which the UE belongs (S713).

Thereafter, the process of optimizing the idle mode operation in the femto cell is performed in the same manner as described above with reference to FIG. 3, so a detailed description thereof will be omitted.

The method described so far may be implemented by software, hardware or their combination. For example, the method according to the present invention may be stored in a storage medium (e.g., an internal memory, a flash memory of a mobile terminal, a hard disk, or the like), and may be implemented by codes or command languages in a software program that can be executed by a processor (e.g., an internal microprocessor of a mobile terminal).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for operating a femto cell in an idle mode, the method comprising:
   determining a first femto cell is to enter an idle mode when there is no connected terminal or only one or more terminals in the idle mode exists in the first femto cell;
   transmitting, by the first femto cell, information regarding one or more neighboring femto cells that neighbor the first femto cell to a femto cell controller if it is determined that the first femto cell is to enter the idle mode;
   receiving, by the first femto cell, control information regarding the idle mode from the femto cell controller, wherein the control information includes an operation parameter for minimizing interference between the first femto cell and the one or more neighboring femto cells;
   operating in the idle mode on a basis of the operation parameter;
   determining whether to change the first femto cell into an active mode after the idle mode operation;
   transmitting, by the first femto cell, information regarding one or more femto cells that neighbor the first femto cell to the femto cell controller if it is determined to change the first femto cell into the active mode;
   receiving, by the first femto cell, control information regarding the active mode from the femto cell controller, wherein the control information includes an operation parameter for minimizing interference between the first femto cell and at least one of the neighboring femto cell and a macro cell; and
   changing the first femto cell into an active mode on the basis of the operation parameter,
   wherein the information regarding the one or more neighboring femto cells includes one or more of identification information of the one or more neighboring femto cells and information indicating whether or not the one of more neighboring femto cells operate in an idle mode, and
   wherein the control information is information for controlling signals transmitted by the first femto cell and the at least one of neighboring femto cells such that the signals are continuously transmitted without overlapping with each other within a particular time interval.

2. The method of claim 1, wherein, in transmitting the information regarding one or more neighboring femto cells, one or more of identification information and location information of the first femto cell are transmitted.

3. The method of claim 1, wherein a guard interval is inserted into a transmission interval between the signals.

4. The method of claim 1, wherein the control information is for controlling a reference signal and system information to be transmitted by the first femto cell.

5. The method of claim 4, wherein the control information includes one or more of a periodicity, a transmission interval, and an offset time with respect to the reference signal and the system information.

* * * * *